(12) United States Patent
Puri et al.

(10) Patent No.: US 9,731,552 B2
(45) Date of Patent: Aug. 15, 2017

(54) DIFFERENTIAL ASSEMBLY WITH LUBRICATION CONTROL ELEMENT

(71) Applicant: GM GLOBAL TECHNOLOGY OPERATIONS LLC, Detroit, MI (US)

(72) Inventors: Bhapinder Puri, Troy, MI (US); William J. Wilson, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 314 days.

(21) Appl. No.: 14/599,780

(22) Filed: Jan. 19, 2015

(65) Prior Publication Data
US 2016/0208907 A1 Jul. 21, 2016

(51) Int. Cl.
*F16H 57/04* (2010.01)
*B60B 35/16* (2006.01)

(52) U.S. Cl.
CPC ......... *B60B 35/16* (2013.01); *F16H 57/0443* (2013.01); *F16H 57/0457* (2013.01); *F16H 57/0471* (2013.01); *F16H 57/0483* (2013.01)

(58) Field of Classification Search
None
See application file for complete search history.

(56) References Cited

U.S. PATENT DOCUMENTS

| 7,229,376 | B1* | 6/2007 | Irwin | F16H 57/0483 |
| | | | | 475/160 |
| 2013/0000443 | A1* | 1/2013 | Iwasa | F16H 57/0423 |
| | | | | 74/607 |

* cited by examiner

*Primary Examiner* — Edwin A Young
(74) *Attorney, Agent, or Firm* — Cantor Colburn LLP

(57) ABSTRACT

An axle assembly having a differential gear set is provided. The axle assembly includes a housing having an interior portion sized to receive the differential gear set. At least one axle tube extends from a side of the housing. At least one axle is coupled to the differential gear set and extending through the at least one axle tube. A lubrication control member is coupled between the axle and the housing, the lubrication control member having at least one orifice, the orifice defining a lubrication flow path between the interior portion and the at least axle tube.

16 Claims, 5 Drawing Sheets

DIFFERENTIAL ASSEMBLY WITH LUBRICATION CONTROL ELEMENT

FIELD OF THE INVENTION

The subject invention relates to a vehicle differential assembly, and more particularly, to a vehicle differential assembly having an element for controlling the flow of lubrication to the axle tubes.

BACKGROUND

Vehicles, such as automobiles and trucks for example, include an axle assembly that transmits rotational energy developed by the vehicle engine to the wheels. The axle assembly will typically include a housing having a differential gear set. The differential gear set includes a planetary gear train that allows the wheels of the vehicle to turn at different rotational speeds. This allows an outer wheel to rotate faster than the inner wheel during a turn. The housing typically includes a sump that contains a lubricant. The lubricant is moved by one of the differential gears, such as the ring gear for example, that causes the lubricant to be transferred within the housing to lubricate the components.

In addition to the differential gears, the axle assembly may include other components, such as wheel bearings for example, that may benefit from periodic lubrication. Typically, the axle assembly is arranged to flow oil from the housing into a housing tube that routes the lubricant to the wheel bearings. However, when the vehicle is parked on an inclined surface, the lubricant in the axle tubes may flow under the influence of gravity back to the housing resulting in a less than desired level of lubricant in the axle tube. To accommodate this, the lubricant volume within the sump is increased to maintain the desired lubricant levels in the axle tubes.

Accordingly, it is desirable to provide an axle assembly that maintains a desired level of lubrication to the assembly components while reducing the lubricant volume within the sump.

SUMMARY OF THE INVENTION

In one exemplary embodiment of the invention, an axle assembly having a differential gear set, the axle assembly is provided. The axle assembly includes a housing having an interior portion sized to receive the differential gear set. At least one axle tube extends from a side of the housing. At least one axle is coupled to the differential gear set and extending through the at least one axle tube. A lubrication control member is coupled between the axle and the housing, the lubrication control member having at least one orifice, the orifice defining a lubrication flow path between the interior portion and the at least axle tube.

In another exemplary embodiment of the invention, an axle assembly having a differential gear set is provided. The differential gear set having a ring gear and at least one side gear. The axle assembly includes a housing having an interior portion sized to receive the differential gear set, the housing having a first opening arrange coaxial with the at least one side gear, the first opening having a side wall. At least one axle is provided having an end coupled to the side gear, the axle extending through the first opening. A lubrication control member is coupled to the side wall adjacent the interior portion. The lubrication control member having an inner member having a lubrication opening sized to define a gap between the lubrication control member and the at least one axle. The gap defining a first flow path for transfer of lubricant from the interior portion to the first opening, the lubrication control member further having at least one orifice, the at least one orifice defining a second lubrication flow path from the first opening through to the interior portion.

In yet another exemplary embodiment of the invention, an axle assembly having a differential gear set is provided. The differential gear set having a ring gear and a pair of opposing side gears. The axle assembly including a housing having an interior portion sized to receive the differential gear set, the housing having a first opening arranged coaxial with one of the side gears and a second opening arranged coaxial with a second of the side gears, the first opening and second opening each having a side wall. A first axle is coupled to the first side gear, the first axle extending through the first opening. A second axle is coupled to the second side gear, the second axle extending through the second opening. A first lubrication control member is coupled to the first opening and is disposed about the first axle. The first lubrication control member having a first body and a first inner member, the first inner member defining a third opening sized to define a first gap between the first lubrication control member and the first axle, the first gap defining a first flow path for transfer of lubricant from the interior portion through to the first opening. The first lubrication control member further having at least one first orifice, the at least one first orifice defining a second lubrication flow path from the first opening to the interior portion.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
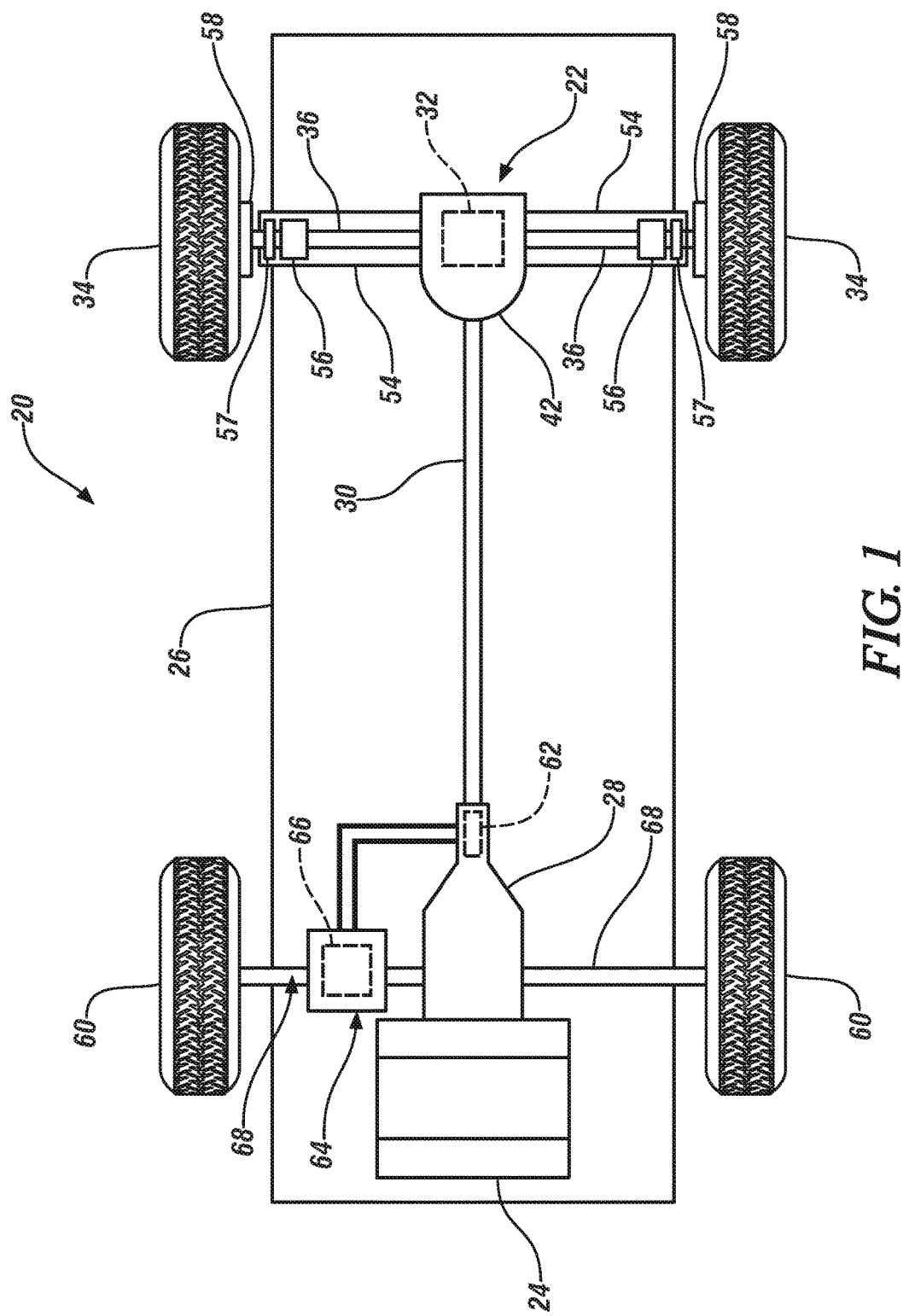
FIG. 1 is a schematic plan view of a vehicle having an axle assembly in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an embodiment of the invention, FIG. 1 illustrates a vehicle 20 having an axle assembly 22. It should be appreciated that the vehicle 20 may be an automobile, truck, van or sport utility vehicle for example. As used herein, the term vehicle is not limited to just an automobile, truck, van or sport utility vehicle, but may also include any self-propelled or towed conveyance suitable for transporting a burden. The vehicle 20 may include an engine 24, such as a gasoline or diesel fueled internal combustion engine. The engine 24 may further be a hybrid type engine that combines an internal combustion engine with an electric motor for example. The engine 24 and axle assembly 22 are coupled to a frame or other chassis structure 26. The engine 24 is coupled to the axle assembly 22 by a transmission 28 and a driveshaft 30. The transmission 28 may be configured to reduce the rotational velocity and increase the torque of the engine output. This modified output is then transmitted to the axle assembly 22 via the driveshaft 30. The axle assembly 22 transmits the output torque from the driveshaft 30 through a differential gear set 32 to a pair of driven-wheels 34 via axles 36.

Figure 2:
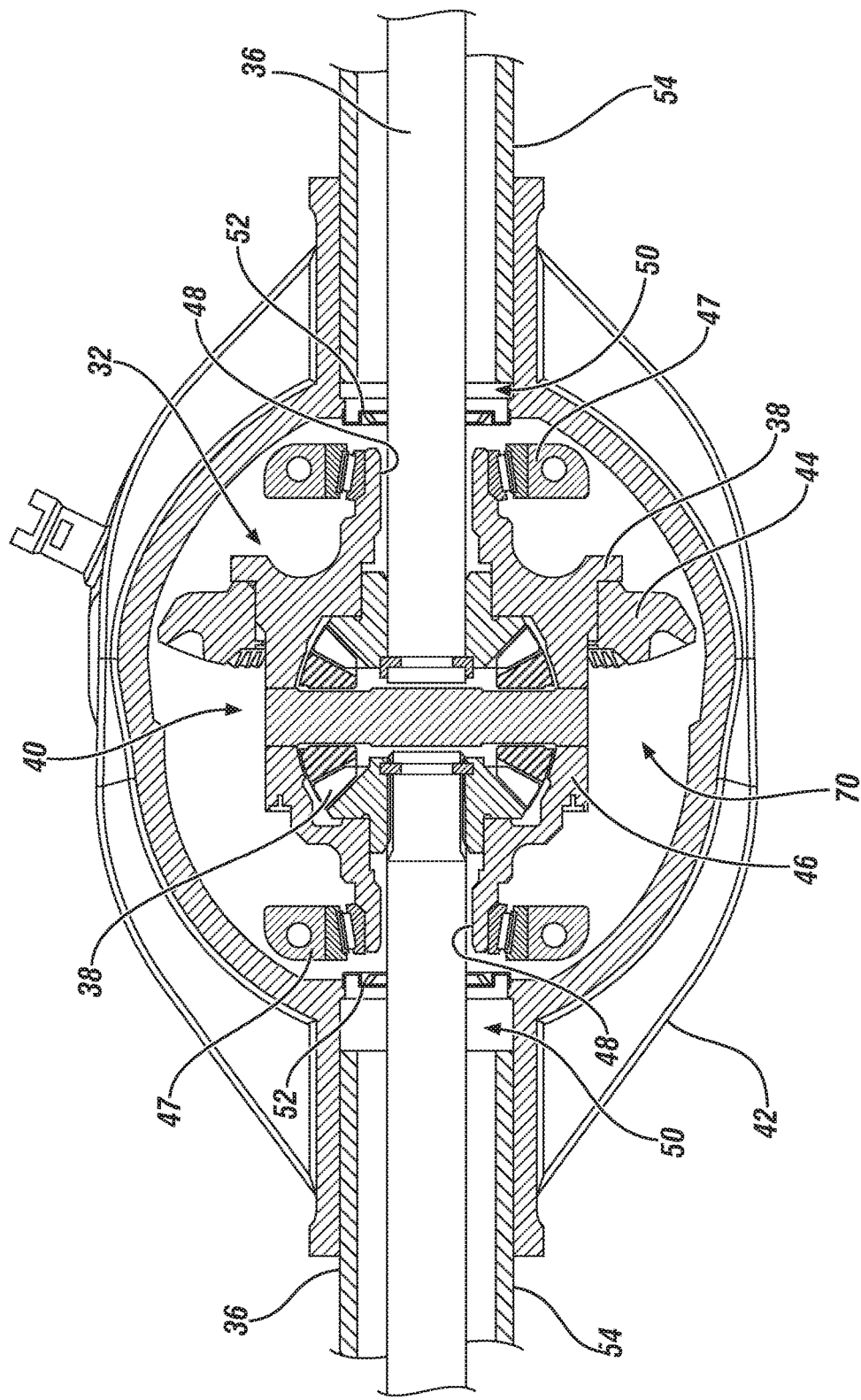
FIG. 2 is a sectional view of a portion of the axle assembly in accordance with an embodiment of the invention.

Referring now to FIG. 2 with continuing reference to FIG. 1, the differential gear set 32 is arranged within an interior portion 40 of a differential housing 42. The differential gear set 32 receives the output from the driveshaft 30 via a pinion (not shown) that transmits the torque to a ring gear 44. The gearing arrangement of the differential gear set 32 is arranged within a case 46 having a pair of opposing openings 48. The differential gear set 32 is supported for rotation within the housing 42 by a pair of differential bearings 47 that are coupled to the case 46 adjacent the openings 48. The differential gear set 32 includes side gears 38 arranged within the case 46 that are coupled to and support one end of the axles 36. The axle housing 42 further includes a sump portion 70 arranged within the interior portion 40. The sump 70 contains a lubricant (not shown) that flows within the housing 42 in response to the rotation of the ring gear 44 to lubricate the differential gear set 32 during operation.

The axles 36 extend through the openings 48 into a pair of opposing cylindrical bores 50 formed in the housing 42. The axles 36 further pass through a lubrication control device 52 that is mounted at the end of bore 50.

In one embodiment, each axle 36 extends through the bore 50 into an axle tube 54 that is coupled to the bore 50. The axle tube 54 includes a hollow interior that extends the length of the axle tube 54. At a distal end of the axle tube 54 from the differential gear set 32, a bearing 56 (FIG. 1) is mounted to support the end of the axle 36 adjacent the driven-wheel 34. A shaft seal 57 is located between the bearing 56 and the wheel 34. A wheel mounting flange 58 is coupled to the end of the axle 36 adjacent the bearing 56. The flange 58 provides an interface for mounting of the driven-wheel 34.

The vehicle 24 further includes a second set of wheels 60 arranged adjacent the engine 24. In one embodiment, the second set of wheels 60 is also configured to receive output from the engine 24. This is sometimes referred to as a four-wheel or an all-wheel drive configuration. In this embodiment, the vehicle 20 may include a transfer case 62 that divides the output from the transmission 28 between the front and rear driven wheels 34, 60. The transfer case 62 transmits a portion of the output to a front axle assembly 64, which may include additional components such as a differential gear set 66 and axles 68 that transmit the output to the wheels 60.

Figure 3:
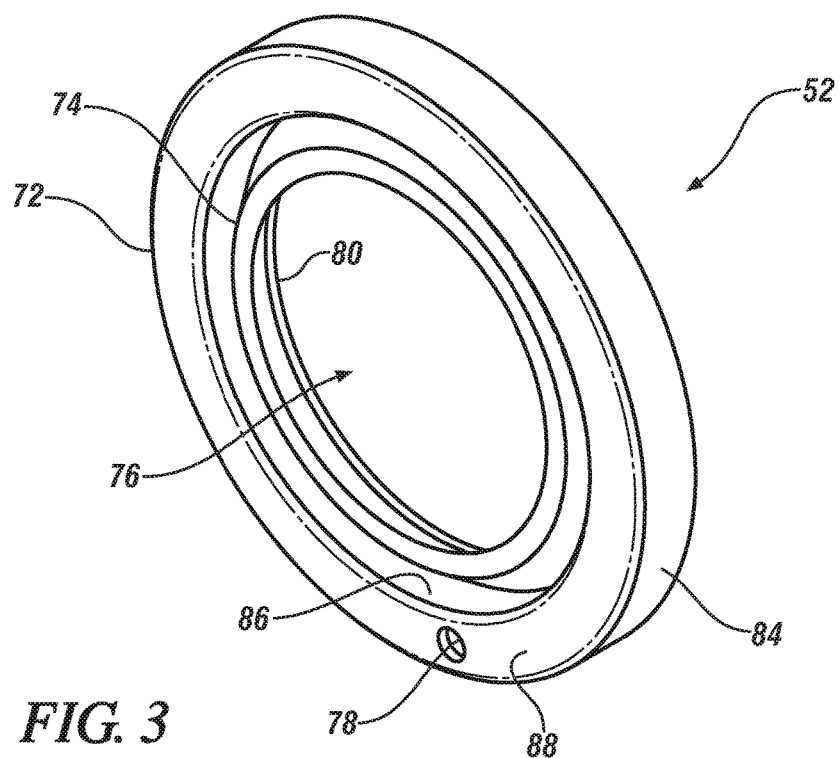
FIG. 3 is a perspective view of a lubricant control member in accordance with an embodiment of the invention.
Figure 4:
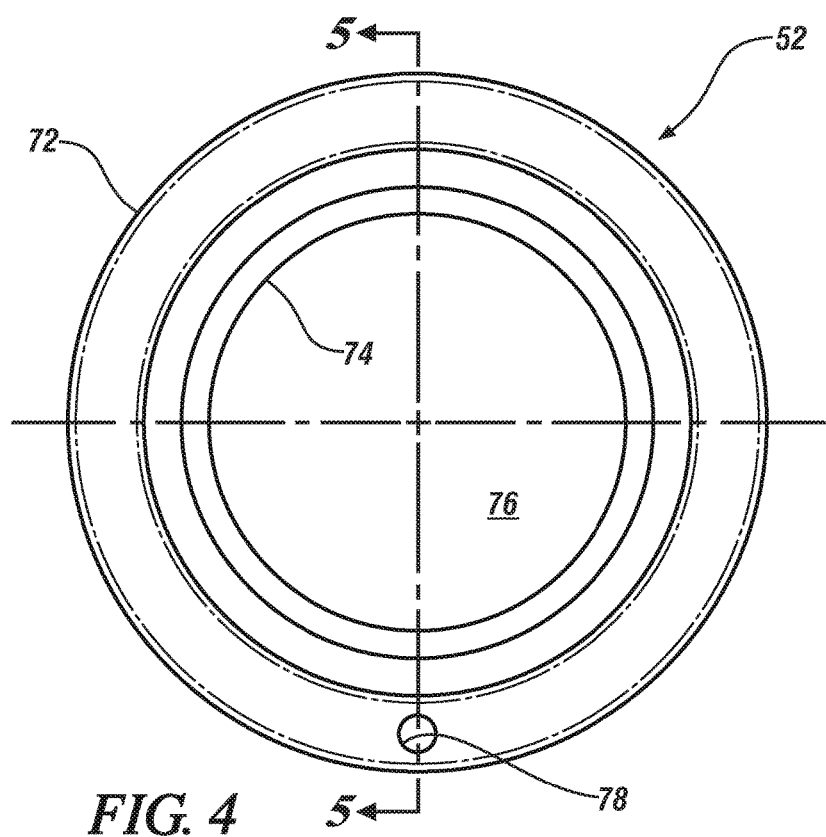
FIG. 4. is a front view of the lubricant control member of FIG. 3.
Figure 5:
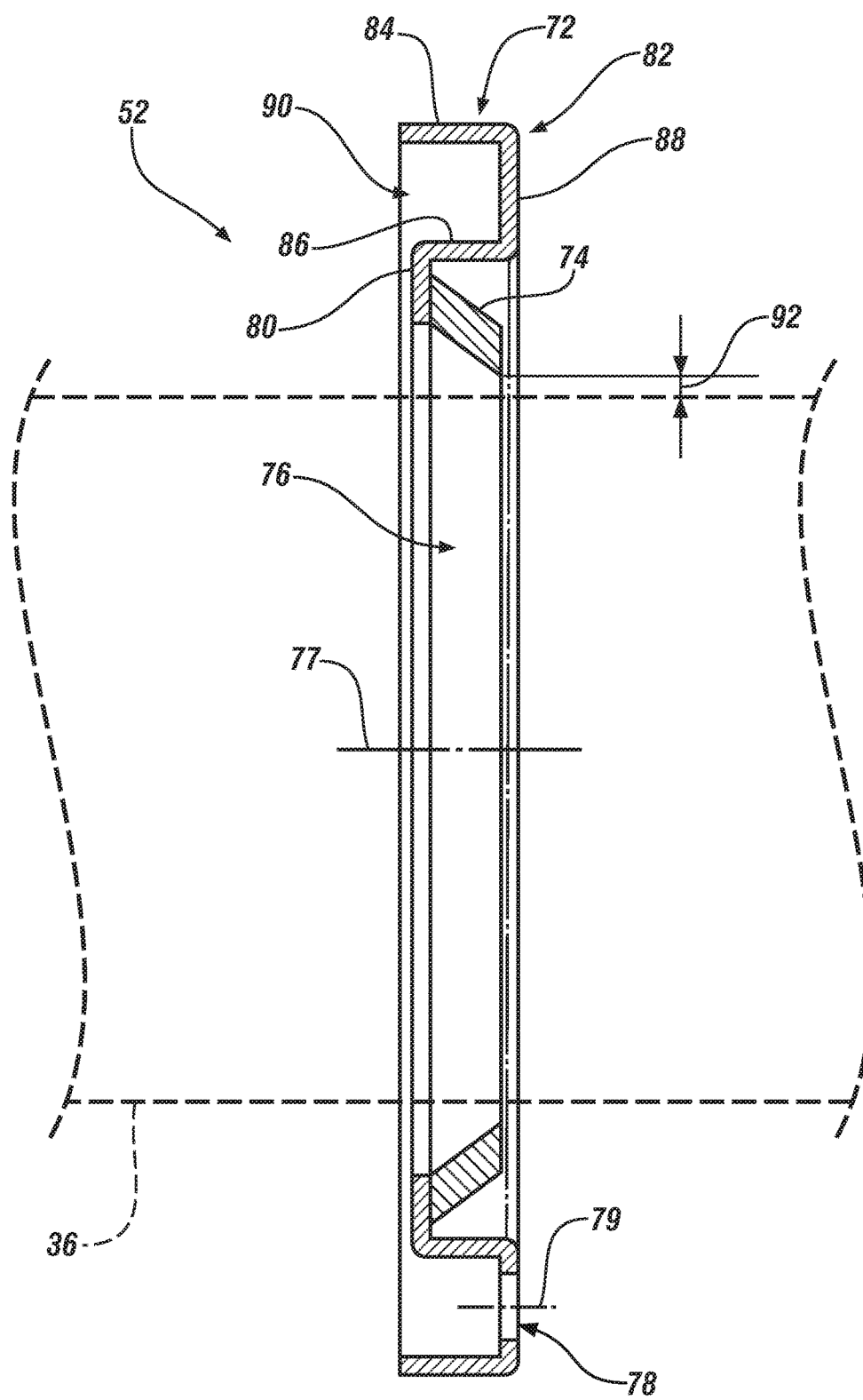
FIG. 5 is a side sectional view of the lubricant control member of FIG. 3.

It should be appreciated that it is desirable to provide the bearing 56 and seal 57 with lubrication to allow the components to have the desired performance. Referring now to FIGS. 3-5 with continuing reference to FIG. 2, an embodiment of the lubrication control device 52 will be described. The lubrication control device 52 includes a generally cylindrical body 72 and an inner member 74. In an embodiment, the inner member 74 has a conical or a frusto-conical shape. The body 72 may be made from a sheet metal material, such as aluminum or steel for example, and the inner member 74 may be made from an elastomeric material, such as rubber for example. The inner member 74 includes an opening 76 that defines a fluid flow path for the flow of lubricant into the bore 50 and axle tube 54. The body 72 also includes an orifice 78 that extends through the body 72 and defines a second fluid flow path for the flow of lubricant from the bore 50 and axle tube 54 back into the sump 70. It should be appreciated that at least a portion of the lubricant that flows into the axle tube 54 will migrate to the bearing 56 and seal 57 to provide the desired lubrication. It should further be appreciated that the orifice 78 restricts the flow of lubricant back into the sump and maintains a level of lubricant within the axle tube 54 for at least a period of time, even when the vehicle is parked on an inclined surface. In one embodiment, the orifice 78 is located on the bottom of the lubricant control device (e.g. closer to the ground). This provides advantages in maintaining lubricant flow into the axle tubes 54, which allows a reduction in the lubricant level within the sump 70.

In one embodiment, the lubrication control device 52 includes a conically shaped inner member 74 (FIG. 5). In this embodiment, the inner diameter of opening 76 is positioned proximate the case 46 and differential bearing 47. The inner member 74 couples to a face of a flange portion 80 of body 72, such as by adhesive bonding for example. In this embodiment, the body 72 may include a U-shaped portion 82 that is defined by a first wall 84, a second wall 86 and a third wall 88 extending between the first wall 84 and the second wall 86. In an embodiment, the first wall 84 has a diameter sized to fit within the housing 42. In one embodiment, the surface of the third wall is facing the differential gear set. The flange 80 is integrally formed with and extends radially inward from the second wall 86. The U-shaped portion defines a channel 90 that extends circumferentially about the body 72. The lubrication control device 52 may be fixed within the bore 50 by a press-fit.

In one embodiment, the orifice 78 extends through the third wall 88 within the channel 90 to define a flow path between the bore 50 and the interior portion 40. In this embodiment, the opening 76 of the inner member 44 is sized and shaped to cooperate with the axle 36 to define a gap 92 (FIG. 5). The gap 92 defines an opening or orifice that extends circumferentially about the shaft and forms a flow path for lubricant to be transferred from the interior portion 40 to the bore 50 and axle tube 54. In one embodiment, the axis 79 of the orifice 78 is parallel to the axis 77 of the opening 76 and the axle 36. It should be appreciated that the size of the orifice 78 and gap 92 may be selected to provide the desired level of lubricant flow into and out of the axle tubes.

Figure 6:
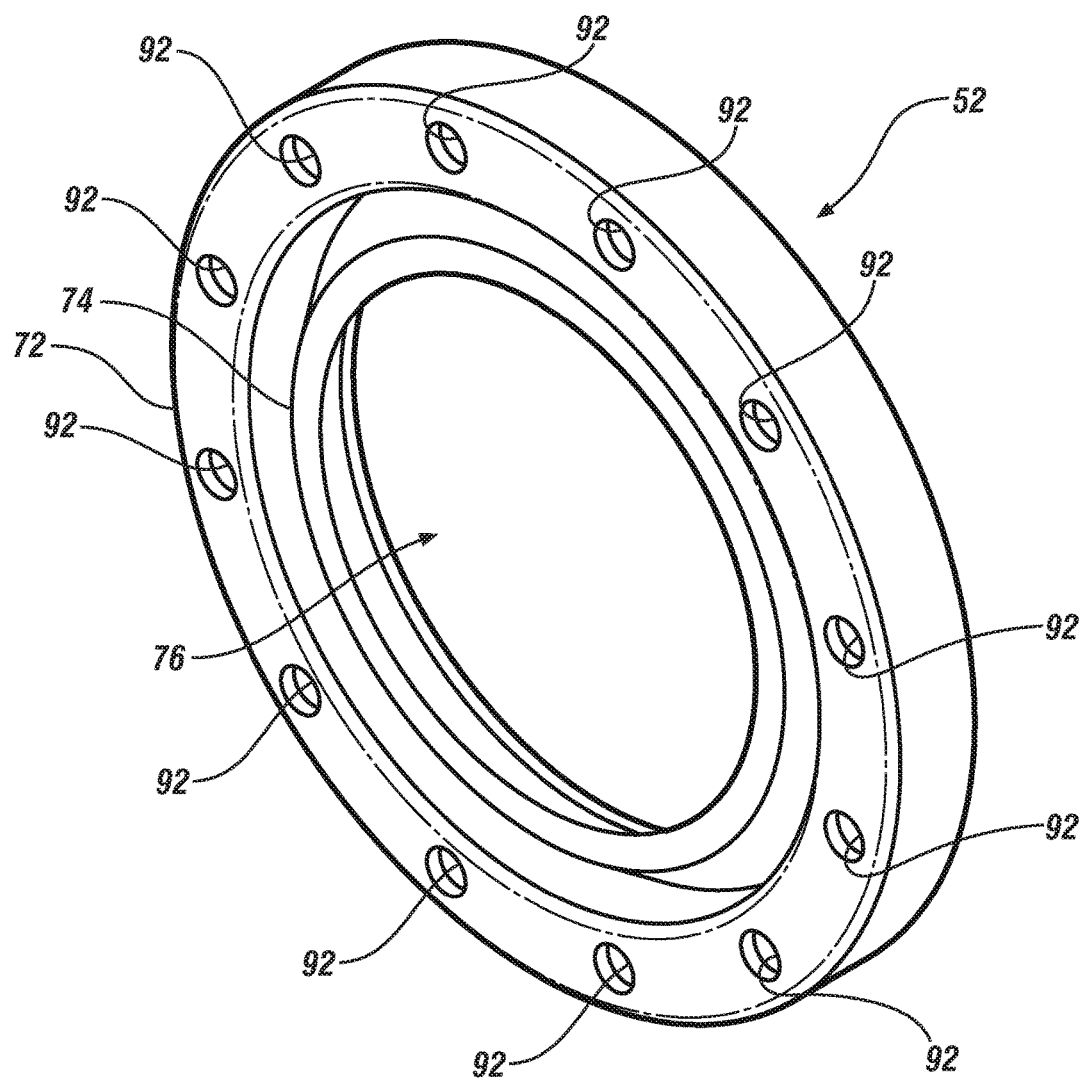
FIG. 6 is a perspective view of a lubricant control member in accordance with another embodiment of the invention.

Referring now to FIG. 6 another embodiment of the lubricant control device 52 is illustrated. In this embodiment, the body 72 includes a plurality of orifices 92. Each of the orifices 92 are arranged circumferentially offset from the adjacent orifices 92. In one embodiment, the orifices 92 are arranged a substantially equal angular distance apart. This arrangement provides advantages in reducing the cost and time of assembly as the lubricant control device may be oriented in a number of positions and still provide the desired function. It should be appreciated that in an embodiment having a plurality of orifices 92, the size or diameter of the orifice may be reduced to compensate for the oil flowing through multiple orifices arranged along the bottom portion of the lubricant control device.

Embodiments of the subject invention provide advantages in the lubrication of bearings and dynamic shaft seals in an axle assembly. Embodiments of the subject invention further provide advantages in controlling the flow into and out of the axle tubes. Embodiments of the invention provide still further advantages in reducing the amount of lubricant within a sump while still providing the desired level of lubrication to the bearings.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An axle assembly having a differential gear set, the axle assembly comprising:
    a housing having an interior portion sized to receive the differential gear set;
    at least one axle tube extending from a side of the housing;
    at least one axle coupled to the differential gear set and extending through the at least one axle tube; and
    a lubrication control member coupled between the at least one axle and the housing, the lubrication control member including a body formed from a metal having an inner diameter and an outer diameter, the outer diameter being sized to fit within the housing, an inner member formed from an elastomeric material is coupled to the body adjacent the inner diameter, a gap is defined between an opening formed in the inner member and the at least one axle, the body having at least one orifice, the at least one orifice defining a lubrication flow path between the interior portion and the at least one axle tube.

2. The axle assembly of claim 1, wherein the inner member has a conical shape.

3. The axle assembly of claim 1, wherein the body is fixed within the housing via a press-fit.

4. The axle assembly of claim 3, wherein:
    the body includes a surface disposed on an end facing the differential gear set; and
    the at least one orifice includes a plurality of orifices radially disposed about and extending through the surface.

5. The axle assembly of claim 1, wherein an axis of the at least one orifice is parallel to an axis of the at least one axle.

6. An axle assembly having a differential gear set, the differential gear set having a ring gear and at least one side gear, the axle assembly comprising:
    a housing having an interior portion sized to receive the differential gear set, the housing having a first opening arranged coaxially with the at least one side gear, the first opening having a side wall;
    at least one axle having an end coupled to the at least one side gear, the at least one axle extending through the first opening; and
    a lubrication control member coupled to the side wall adjacent the interior portion, the lubrication control member having a body formed from a metal and an inner member formed from an elastomeric material coupled to the body, the body including a lubrication opening sized to define a gap between the lubrication control member and the at least one axle, the gap defining a first flow path for transfer of lubricant from the interior portion to the first opening, the lubrication control member further having at least one orifice, the at least one orifice defining a second lubrication flow path from the first opening to the interior portion.

7. The axle assembly of claim 6, wherein the body includes a U-shaped portion that defines an outer diameter of the lubrication control member.

8. The axle assembly of claim 7, wherein the at least one orifice extends through the U-shaped portion.

9. The axle assembly of claim 7, wherein the body further includes a flange extending radially inward from the U-shaped portion.

10. The axle assembly of claim 7, wherein the inner member is conically shaped.

11. An axle assembly having a differential gear set, the differential gear set having a ring gear and a pair of opposing side gears, the axle assembly comprising:
    a housing having an interior portion sized to receive the differential gear set, the housing having a first opening arranged coaxial with one of the pair of opposing side gears and a second opening arranged coaxial with a second of the pair of opposing side gears, the first opening and the second opening each having a side wall;
    a first axle coupled to one of the pair of opposing side gears, the first axle extending through the first opening;
    a second axle coupled to the other of the pair of opposing side gears, the second axle extending through the second opening;
    a first lubrication control member fixed within the first opening and disposed about the first axle, the first lubrication control member having a first body formed from a metal and a first inner member formed from an elastomeric material coupled to the body, the first inner member defining a third opening sized to define a first gap between the first lubrication control member and the first axle, the first gap defining a first flow path for transfer of lubricant from the interior portion through to the first opening, the first lubrication control member further having at least one first orifice, the at least one first orifice defining a second lubrication flow path from the first opening to the interior portion.

12. The axle assembly of claim 11, further comprising a second lubrication control member fixed within the second opening and disposed about the second axle, the second lubrication control member having a second body formed from a metal and a second inner member formed from an elastomeric material coupled to the body, the second inner member defining a fourth opening sized to define a second gap between the second inner member and the second axle, the second gap defining a third flow path for transfer of lubricant from the interior portion through to the second opening, the second lubrication control member further having at least one second orifice, the at least one second orifice defining a fourth lubrication flow path from the second opening to the interior portion.

13. The axle assembly of claim 11, wherein the first body includes a U-shaped portion and a flange extending radially inward from the U-shaped portion, the first inner member being coupled to the flange.

14. The axle assembly of claim 13, wherein:
    the U-shaped portion includes a first wall defining an outer diameter of the first lubrication control member, a second wall adjoining the flange, and a third wall extending between the first wall and the second wall; and the at least one first orifice extends through the third wall.

15. The axle assembly of claim 14, wherein the at least one first orifice includes a plurality of orifices radially disposed about the third wall.

16. The axle assembly of claim 15, wherein:
the first body being coupled to the first opening by a press fit.

* * * * *